United States Patent
Chou

(10) Patent No.: US 10,734,823 B2
(45) Date of Patent: Aug. 4, 2020

(54) POWER SUPPLY DEVICE

(71) Applicant: Chicony Power Technology Co., Ltd., New Taipei (TW)

(72) Inventor: Chun-Fu Chou, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 71 days.

(21) Appl. No.: 16/252,575

(22) Filed: Jan. 19, 2019

(65) Prior Publication Data
US 2020/0177004 A1    Jun. 4, 2020

(30) Foreign Application Priority Data
Nov. 29, 2018   (TW) .............................. 107142682 A

(51) Int. Cl.
| H02J 1/00 | (2006.01) |
| H02J 7/00 | (2006.01) |
| H02J 7/02 | (2016.01) |

(52) U.S. Cl.
CPC ............ *H02J 7/0042* (2013.01); *H02J 7/022* (2013.01)

(58) Field of Classification Search
CPC ........................................................ H02J 1/10
See application file for complete search history.

(56) References Cited

U.S. PATENT DOCUMENTS

| 6,042,400 A  * | 3/2000 | Queffelec | H01R 13/44 439/131 |
| 7,422,437 B1 * | 9/2008 | Lin | H01R 35/04 439/11 |
| 7,859,133 B2 | 12/2010 | Youn et al. | |
| 8,142,228 B1 * | 3/2012 | Wu | H01R 27/02 439/628 |
| 8,154,875 B2 | 4/2012 | Chen et al. | |
| 8,560,014 B1 * | 10/2013 | Hu | H04M 1/0283 361/679.1 |
| 10,615,699 B2 * | 4/2020 | Peng | H02M 3/33576 |

(Continued)

FOREIGN PATENT DOCUMENTS

| CN | 204089297 | 1/2015 |
| CN | 205544457 | 8/2016 |

(Continued)

*Primary Examiner* — Alfonso Perez Borroto
*Assistant Examiner* — Esayas G Yeshaw
(74) *Attorney, Agent, or Firm* — JCIPRNET

(57) ABSTRACT

A power supply device includes a first conversion module and a second conversion module. The first conversion module is adapted to convert a first alternating current into a first direct current and includes a first body, a first input portion having a first alternating current input terminal, a first output portion having a first output terminal, and a first coupling portion having a first coupling terminal. The first coupling terminal and the first output terminal are connected. The second conversion module is adapted to convert a second alternating current into a second direct current and includes a second body, a second input portion having a second alternating current input terminal, a second coupling portion having a second coupling terminal, a third coupling portion having a third coupling terminal, and a second output portion having a second output terminal. The second output terminal and the second coupling terminal are connected.

13 Claims, 6 Drawing Sheets

(56) References Cited

U.S. PATENT DOCUMENTS

| | | | | |
|---|---|---|---|---|
| 2002/0132651 A1* | 9/2002 | Jinnouchi | ............ | H04B 1/3888 455/573 |
| 2004/0127080 A1* | 7/2004 | Chen | .................... | H01R 13/447 439/172 |
| 2004/0201950 A1* | 10/2004 | Bothe | .................. | H01R 31/065 361/603 |
| 2005/0127870 A1* | 6/2005 | Shin | .................... | H02J 2207/40 320/112 |
| 2008/0211310 A1* | 9/2008 | Jitaru | .................. | H01R 31/065 307/72 |
| 2016/0209885 A1* | 7/2016 | Ellis | ........................ | G06F 1/189 |
| 2016/0294201 A1* | 10/2016 | Avital | .................... | H02J 7/0044 |
| 2018/0115128 A1* | 4/2018 | Choi | ...................... | G06F 1/1632 |

FOREIGN PATENT DOCUMENTS

| | | |
|---|---|---|
| CN | 106992579 | 7/2017 |
| CN | 108258773 | 7/2018 |
| TW | I614595 | 2/2018 |

\* cited by examiner

POWER SUPPLY DEVICE

CROSS-REFERENCE TO RELATED APPLICATION

This application claims the priority benefit of Taiwan application serial no. 107142682, filed on Nov. 29, 2018. The entirety of the above-mentioned patent application is hereby incorporated by reference herein and made a part of this specification.

BACKGROUND

Technical Field

The disclosure relates to a power supply device; more particularly, the disclosure relates to a multi-functional power supply device.

Description of Related Art

Charging smart phones and tablet PCs are the most popular portable electronic products, and hence normal users carry a charger for instant charging. In order to meet the charging requirements of portable electronic products, small chargers characterized by portability have been gradually developed. However, the disadvantage of the small chargers is that the output energy is small, and the purpose of fast charging cannot be achieved. Moreover, the small chargers are not suitable for large-size notebook computers or electronic home appliances with the demand for large power. On the other hand, large chargers having large output power and aiming at fast charging are often bulky, heavy, and not portable.

Therefore, in response to different charging demands, the existing charging products are often categorized into these two types. The portable chargers that is easy to carry are made in light weight and small volume, while the large chargers with good charging performance is mainly used indoors. It is thus necessary for users to purchase these two types of chargers, which causes waste of resources.

SUMMARY

The disclosure provides a power supply device characterized by portability and large output energy and adapted to be applied to handheld electronic products and electronic home appliances.

In an embodiment of the disclosure, a power supply device having a first conversion module and a second conversion module is provided. The first conversion module is adapted to convert a first alternating current into a first direct current and includes a first body. The first conversion module also has a first input portion which has a first alternating current input terminal and is configured to input the first alternating current. The first conversion module also has a first output portion which has a first output terminal and is configured to output the first direct current. The first conversion module also has a first coupling portion which has a first coupling terminal. The first coupling terminal and the first output terminal are connected to each other. The second conversion module is adapted to convert a second alternating current into a second direct current and includes a second body. The second conversion module also has a second input portion which has a second alternating current input terminal and is configured to input the second alternating current. The second conversion module also has a second coupling portion which has a second coupling terminal. The second conversion module also has a third coupling portion which has a third coupling terminal. The third coupling terminal and the second alternating current input terminal are electrically connected to each other. The second conversion module also has a second output portion which has a second output terminal and is configured to output the second direct current. The second output terminal and the second coupling terminal are connected to each other.

Here, the first conversion module and the second conversion module are adapted to be separated from each other or combined together. When the first conversion module and the second conversion module are separated from each other, the first conversion module and the second conversion module are able to individually perform power conversion, and when the first conversion module and the second conversion module are combined together, the first conversion module and the second conversion module constitute a third conversion module adapted to convert a third alternating current into a third direct current.

In view of the above, the power supply device provided in one or more exemplary embodiments has the first conversion module and the second conversion module. The first conversion module and the second conversion module are individual structures and can be charged separately. When the first conversion module and the second conversion module are separated from each other, the volume and the weight of the first conversion module are both reduced, so that the first conversion module can be easily carried and can be applied to portable electronic products with low power requirements. After separation, the second conversion module is still capable of performing the charging function and is adapted to be placed indoors and be applied to electronic home appliances with high power requirements. If the first conversion module and the second conversion module are combined with each other, the third conversion module is formed. Practically, the charging speed of the third conversion module is faster than the charging speed of the first conversion module and the charging speed of the second conversion module, so as to achieve fast charging.

To be specific, the power supply device provided in one or more embodiments has multiple modes of use and allows the first conversion module and the second conversion module to be separated from each other. As such, the first conversion module can be carried by the user when the user goes out, and the second conversion module can be placed indoors and can be independently operated. Besides, the first conversion module and the second conversion module can be combined to form the third conversion module capable of performing power supply and charging functions in an enhanced mode. Compared to the conventional power supply device, the power supply device provided in one or more embodiments of the disclosure can perform power supply and charging functions in the portable mode, the home-use mode, and the enhanced mode; in response to different power supply and charging requirements, the modules in the power supply device can be combined or separated. Accordingly, it is no longer necessary to buy several charges for specific use, so as to prevent waste of resources.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated

DESCRIPTION OF THE EMBODIMENTS

Figure 1A:
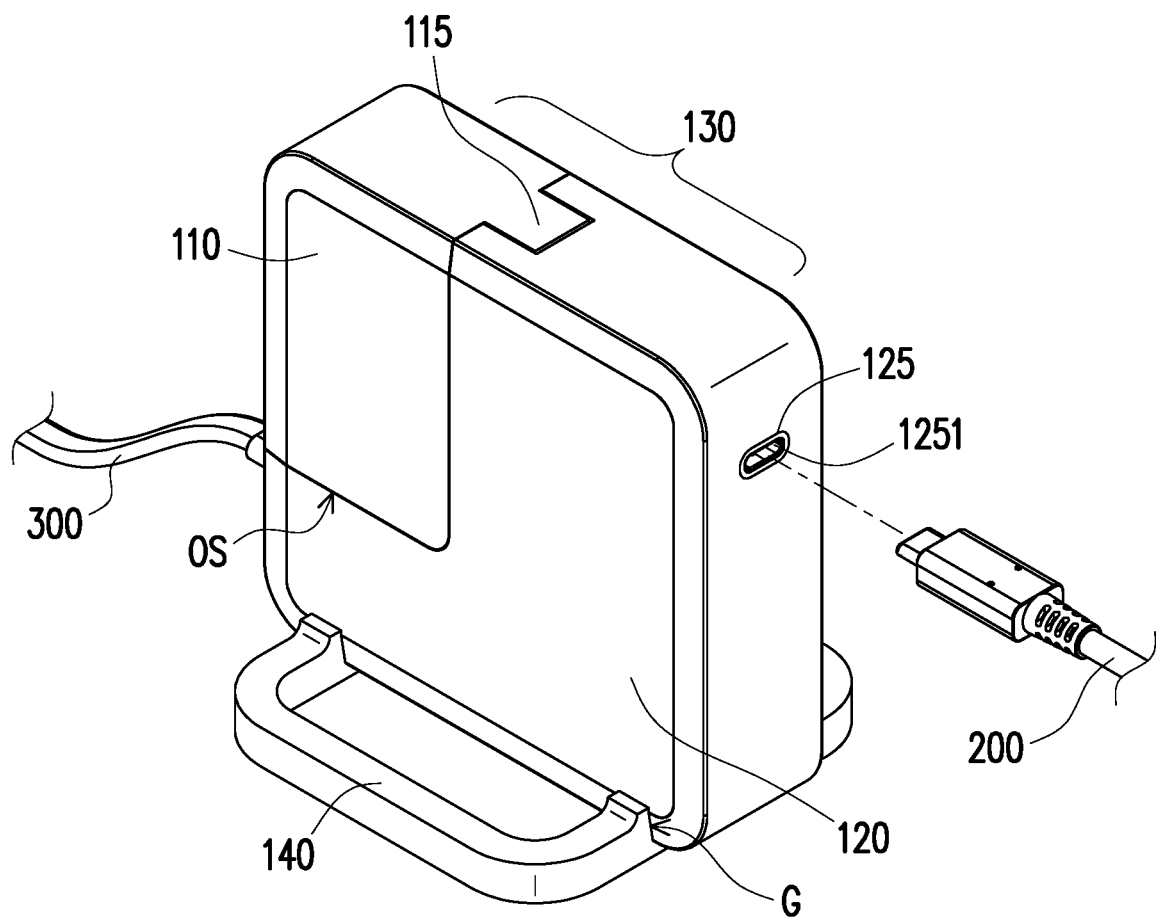
FIG. 1A is a schematic three-dimensional view of a power supply device according to an embodiment of the disclosure.
Figure 1B:
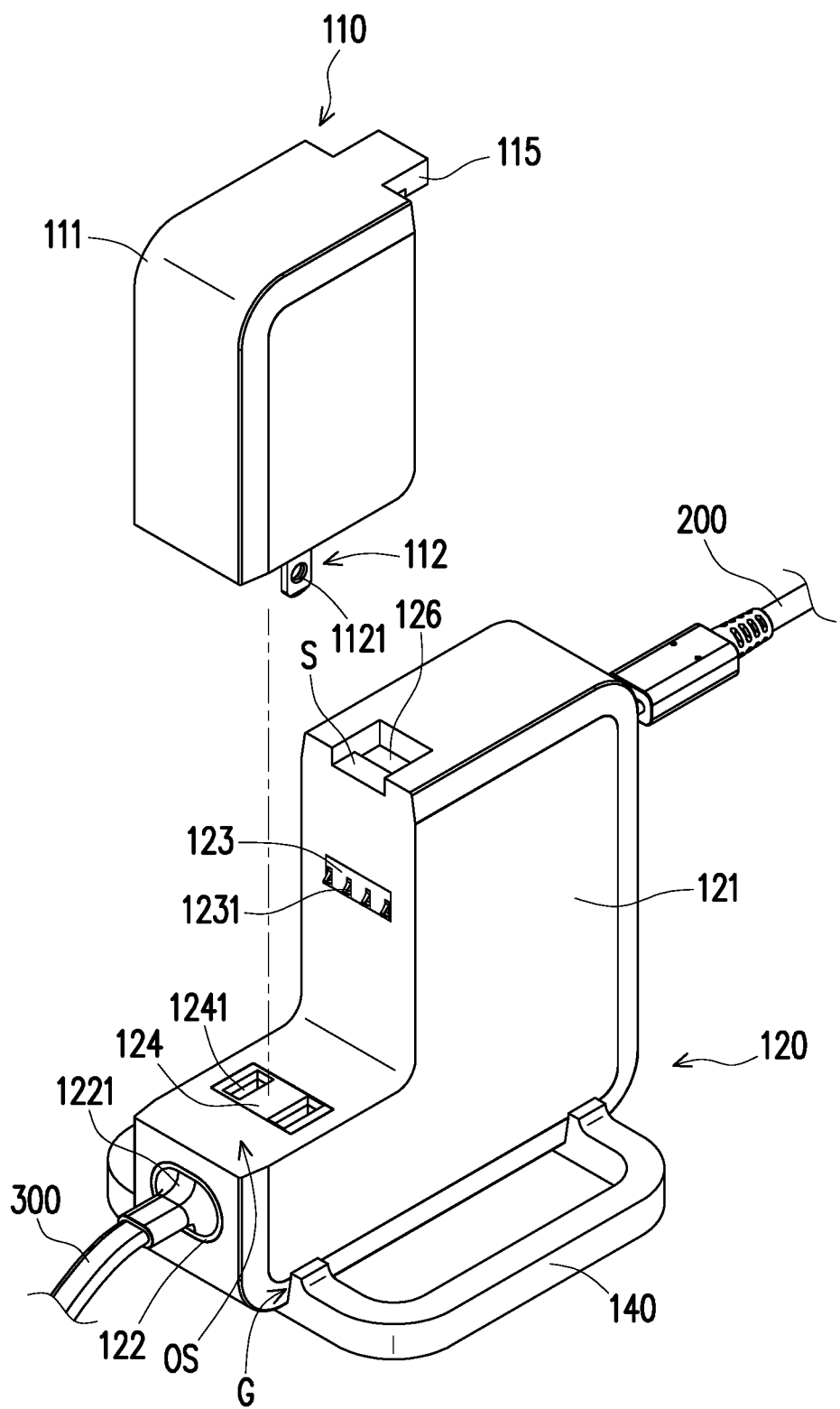
FIG. 1B is a schematic exploded view of elements in the power supply device depicted in FIG. 1A.
Figure 1C:
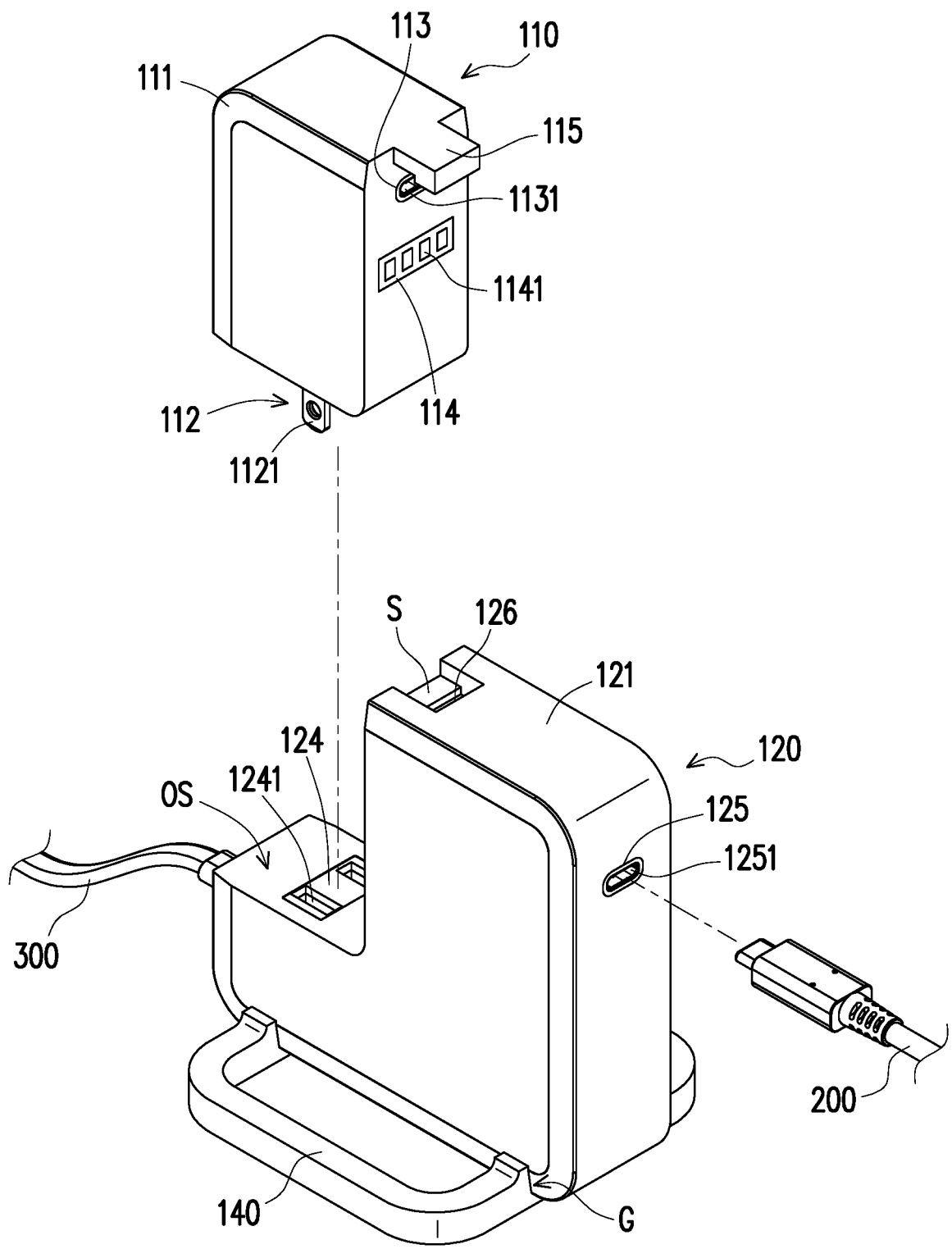
FIG. 1C is a schematic exploded view of elements in the power supply device depicted in FIG. 1A in another direction.

FIG. 1A is a schematic three-dimensional view of a power supply device according to an embodiment of the disclosure. FIG. 1B is a schematic exploded view of elements in the power supply device depicted in FIG. 1A. FIG. 1C is a schematic exploded view of elements in the power supply device depicted in FIG. 1A in another direction.

With reference to FIG. 1A to FIG. 1C, a power supply device 100 provided herein is a power supply capable of converting electric energy (different from the power supply for supplying power ' example as battery or power bank etc.), and the power supply device 100 converts the standard voltage AC (with the frequency of 50 Hz or 60 Hz) into a low voltage DC (at 12 V, 5 V, or 3.3 V) and transmits the electric energy to electronic products for normal operation or transmits the electric energy to batteries for charging. In brief, the power supply device 100 is connected to an electronic product (not shown) through a transmission line 200 and a power socket (not shown) through a power line 300. The high voltage is transmitted to the power supply device 100 through the power line 300 and converted into a low voltage direct current (DC) after transformation and rectification. The low voltage DC is then transmitted to the electronic product requiring the low voltage DC through the transmission line 200.

In an embodiment of the disclosure, the power supply device 100 includes a first conversion module 110 and a second conversion module 120.

Figure 2A:
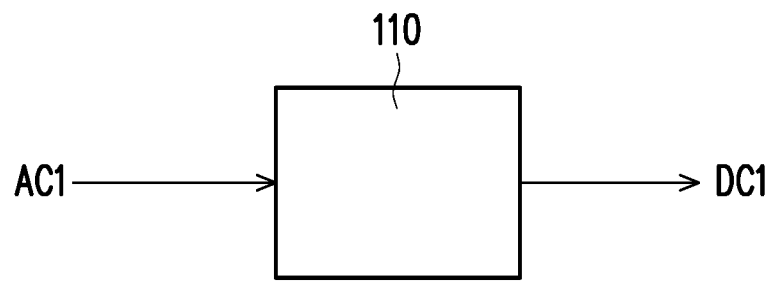
FIG. 2A is a block view of power conversion of the first conversion module depicted in FIG. 1B.
Figure 2B:
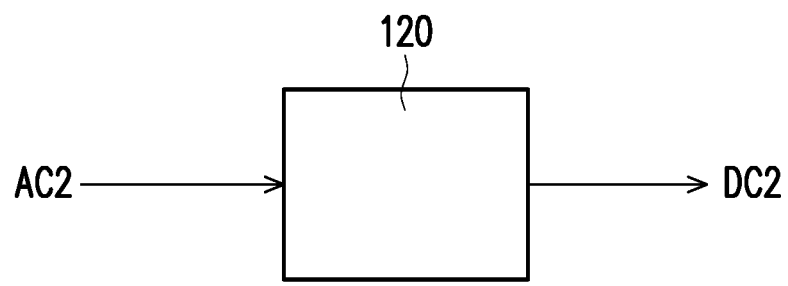
FIG. 2B is a block view of power conversion of the second conversion module depicted in FIG. 1B.
Figure 2C:
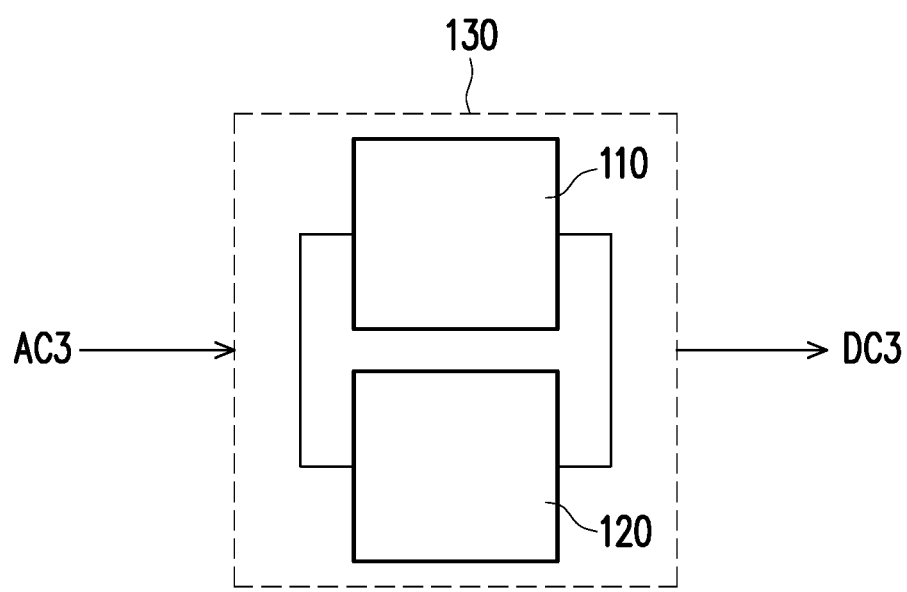
FIG. 2C is a block view of power conversion of the first conversion module combining the second conversion module depicted in FIG. 1A.

FIG. 2A is a block view of power conversion of the first conversion module depicted in FIG. 1B. FIG. 2B is a block view of power conversion of the second conversion module depicted in FIG. 1B. FIG. 2C is a block view of power conversion of the first conversion module combining the second conversion module depicted in FIG. 1A.

Please refer to FIG. 1B, FIG. 1C, and FIG. 2A. The first conversion module 110 is adapted to convert a first alternating current (AC) AC1 into a first direct current DC1. The first conversion module 110 includes a first body 111, a first input portion 112, a first output portion 113, and a first coupling portion 114. The first input portion 112 is disposed on the first body 111 and has a first alternating current input terminal 1121 configured to connect the power socket (not shown), so as to input the first alternating current AC1. The first output portion 113 is disposed on the first body 111 and has a first output terminal 1131 configured to connect the transmission line 200 to output the first direct current DC1 to the electronic product (not shown). The first coupling portion 114 is disposed below the first output portion 113 and has a first coupling terminal 1141. Here, the first coupling terminal 1141 and the first output terminal 1131 are electrically connected to each other, which indicates that the converted first direct current DC1 is transmitted to the first coupling terminal 1141 and the first output terminal 1131 at the same time.

Please refer to FIG. 1B, FIG. 1C, and FIG. 2B. The second conversion module 120 is adapted to convert a second alternating current AC2 into a second direct current DC2. The second conversion module 120 includes a second body 121, a second input portion 122, a second coupling portion 123, a third coupling portion 124, and a second output portion 125. The second input portion 122 is disposed on the second body 121, has a second alternating current input terminal 1221, and is connected to the power socket (not shown) through the power line 300, so as to input the second alternating current AC2. The second coupling portion 123 has a second coupling terminal 1231. The third coupling portion 124 has a third coupling terminal 1241. The third coupling terminal 1241 and the second alternating current input terminal 1221 are electrically connected to each other. The second output portion 125 has a second output terminal 1251 that is configured to connect the transmission line 200 and output the second direct current DC2 to the electronic product (not shown). Here, the second output terminal 1251 and the second coupling terminal 1231 are connected to each other.

The first conversion module 110 and the second conversion module 120 are adapted to be separated from each other or be combined with each other. When the first conversion module 110 and the second conversion module 120 are separated from each other, the first conversion module 110 and the second conversion module 120 can individually perform power conversion and output the first direct current DC1 and the second direct current DC2, so as to act as two independently operated chargers. In the present embodiment, for instance, the volume and the weight of the first conversion module 110 are smaller and less than those of the second conversion module 120. This indicates that the first conversion module 110 is suitable for being carried but has low power output and is thus mainly applied for charging handheld electronic products. The second conversion module 120 is adapted to be placed indoors but has high power output and is thus mainly applied for charging or supplying power to electronic home appliances.

In other embodiments, the volume and the power output of the first conversion module 110 are substantially the same as those of the second conversion module 120, so that both the first conversion module 110 and the second conversion module 120 are adapted for charging or supplying power to portable products or electronic home appliances. Note that the volume and the power output of the first conversion module 110 and those of the second conversion module 120 are not limited in the disclosure.

Please refer to FIG. 1A and FIG. 2C. When the first conversion module 110 and the second conversion module 120 are combined, a third conversion module 130 is formed. The third conversion module 130 is adapted to convert a third alternating current AC3 into a third direct current DC3. When the first conversion module 110 and the second conversion module 120 are combined, the first coupling terminal 1141 of the first coupling portion 114 and the second coupling terminal 1231 of the second coupling portion 123 are coupled to each other.

Figure 3A:
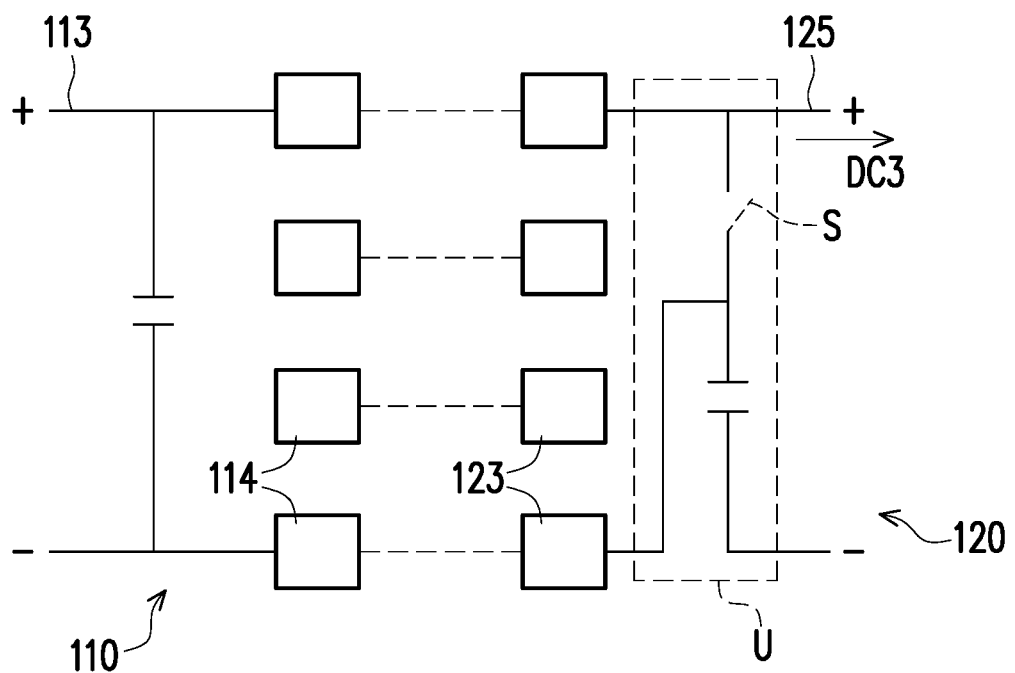
FIG. 3A is a schematic view illustrating that the output terminal depicted in FIG. 2C is in series connections.
Figure 3B:
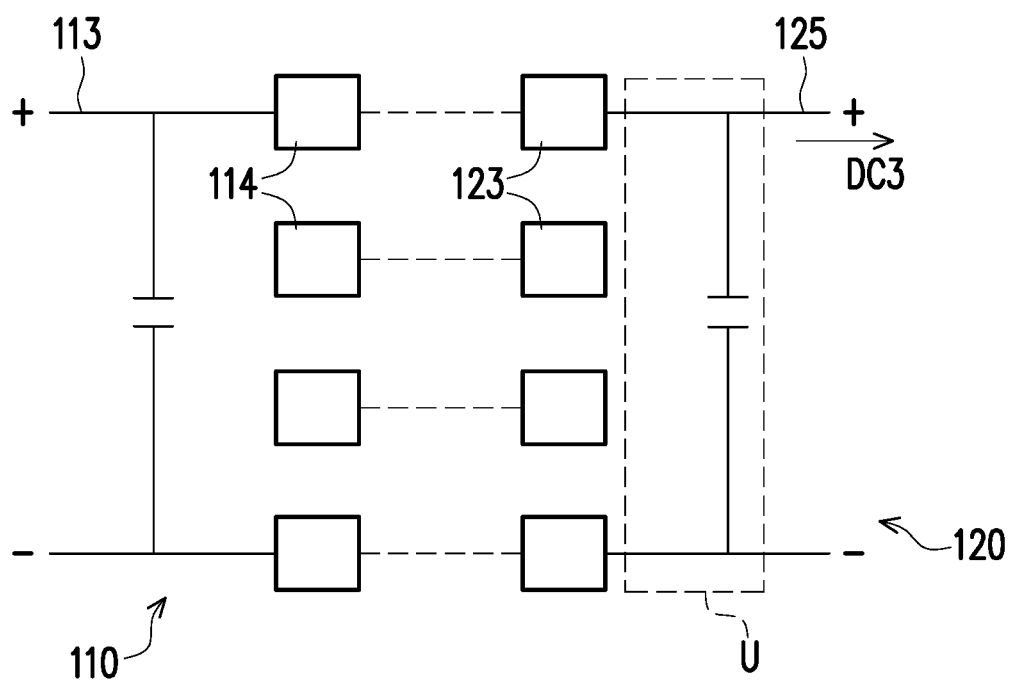
FIG. 3B is a schematic view illustrating that the output terminal depicted in FIG. 2C is in parallel connections.

FIG. 3A is a schematic view illustrating that the output terminal depicted in FIG. 2C is in series connections. FIG. 3B is a schematic view illustrating that the output terminal depicted in FIG. 2C is in parallel connections.

Please refer to FIG. 3A, FIG. 3B, FIG. 1B, and FIG. 1C. Specifically, the second conversion module 120 further includes a DC processing unit U coupled between the second coupling terminal 1231 of the second coupling portion 123 and the second output terminal 1251 of the second output portion 125. The third alternating current AC3 is input to the second conversion module 120 from the second alternating current input terminal 1221 and undergoes power conversion through the DC processing unit U, and the second output terminal 1251 of the second output portion 125 outputs the third direct current DC3.

In the present embodiment, the DC processing unit U is, for instance, a series output circuit (FIG. 3A). The DC processing unit U may also be a parallel output circuit (FIG. 3B). If the DC processing unit U is, for instance, a series output circuit, after the first conversion module 110 and the second conversion module 120 are electrically connected to each other, the voltage of the output third direct current DC3 is greater than the voltage of the first direct current DC1 or the voltage of the second direct current DC2. If the DC processing unit U is, for instance, a parallel output circuit, after the first conversion module 110 and the second conversion module 120 are electrically connected to each other, the output third direct current DC3 is greater than the first direct current DC1 or the second direct current DC2.

With reference to FIG. 1C and FIG. 3A, the second output terminal 1251 further includes a positive terminal + and a negative terminal −. The DC processing unit U further includes a touch switch S, and the touch switch S is electrically coupled between the positive terminal + and the negative terminal −. When the first conversion module 110 and the second conversion module 120 are combined together, the touch switch S is switched off; when the first conversion module 110 and the second conversion module 120 are not combined together, the touch switch S is switched on. Particularly, when the touch switch S is switched off, the first conversion module 110 and the second conversion module 120 are serially connected. When the touch switch S is switched on, the first conversion module 110 and the second conversion module 120 are separated from each other and independently operated.

Please refer to FIG. 1A to FIG. 1C and FIG. 2C. In the present embodiment, when the first conversion module 110 and the second conversion module 120 are combined together to constitute the third conversion module 130, the first alternating current input terminal 1121 and the third coupling terminal 1241 are engaged to combine the first body 111 and the second body 121. This indicates that the third alternating current AC3 is transmitted from the second alternating current input terminal 1221 to the second conversion module 120 and is divided to the first conversion module 110 through the third coupling terminal 1241 and first alternating current input terminal 1121. The first direct current DC1 converted by the first conversion module 110 is then transmitted to the DC processing unit U through the first coupling terminal 1141 and the second coupling terminal 1231 and is integrated with the second direct current DC2 converted by the second conversion module 120, so as to generate the third direct current DC3.

In the present embodiment, the second body 121 has a notch OS. When the first body 111 and the second body 121 are combined together, the first body 111 is securely mounted to the notch OS of the second body 121 to form an intact appearance. Besides, the first coupling portion 114, the second coupling portion 123, the first input portion 112, and the third coupling portion 124 are all hidden between the first body 111 and the second body 121.

In detail, the first body 111 has a latching structure 115, and the second body 121 has an engaging structure 126 disposed corresponding to the latching structure 115. The latching structure 115 and the engaging structure 126 are adapted to be latched to each other, so as to position the first body 111 and the second body 121 and prevent the first body 111 and the second body 121 from being separated from each other by an external force. In the present embodiment, the latching structure 115 is a hook portion, and the engaging structure 126 is a groove accommodating the hook portion. Since the shape of the hook portion corresponds to the shape of the groove, the connected hook portion and groove can be formed with a smooth appearance.

In particular, the touch switch S is disposed on the engaging structure 126, and if the latching structure 115 of the first body 111 and the engaging structure 126 of the second body 121 are combined with each other, the touch switch S can be switched off through sensing pressure, distance, or other similar detecting parameters. By contrast, if the latching structure 115 of the first body 111 and the engaging structure 126 of the second body 121 are separated from each other, the touch switch S is switched on.

With reference to FIG. 1A to FIG. 1C, the power supply device 100 includes a base bracket 140 separably disposed at a bottom of the second body 121 and configured to increase a support area. In particular, base bracket 140 has a positioning groove G formed on an upper surface of the base bracket 140, and a width of an inner diameter of the positioning groove G corresponds to a width of an outer diameter of the second body 121.

To sum up, the power supply device provided in one or more exemplary embodiments has the first conversion module and the second conversion module. The first conversion module and the second conversion module are individual structures and can be charged separately. When the first conversion module and the second conversion module are separated from each other, the volume and the weight of the first conversion module are both reduced, so that the first conversion module can be easily carried and can be applied to portable electronic products with low power requirements. After separation, the second conversion module is still capable of performing power supply and charging functions and is adapted to be placed indoors, so as to be applicable to electronic home appliances with high power requirements. If the first conversion module and the second conversion module are combined with each other, the third conversion module is formed. Practically, the electric energy of the third conversion module is greater than the electric energy of the first conversion module and the electric energy of the second conversion module, so as to charge the electronic home appliances with high power requirements or rapidly charge the portable electronic products with low power requirements.

To be specific, the power supply device provided in one or more embodiments has multiple modes of use and allows the first conversion module and the second conversion module to be separated from each other. As such, the first conversion module can be carried by the user when the user goes out, while the second conversion module can be placed indoors and can be independently operated. Besides, the first conversion module and the second conversion module can be combined to form the third conversion module capable of performing power supply and charging functions in an enhanced mode. Compared to the conventional power supply device, the power supply device provided in one or more embodiments of the disclosure can perform charging functions in the portable mode, the home-use mode, and the enhanced mode; in response to different power supply and charging requirements, the modules in the power supply device can be combined or separated. Accordingly, it is no longer necessary to buy several charges for specific use, so as to prevent waste of resources.

Although exemplary embodiments of the disclosure have been described in detail above, the disclosure is not limited to specific embodiments, and various modifications and changes may be made within the scope of the disclosure defined in the claims.

What is claimed is:

1. A power supply device, comprising:
    a first conversion module, adapted to convert a first alternating current into a first direct current and comprising:
        a first body;
        a first input portion, having a first alternating current input terminal and configured to input the first alternating current;
        a first output portion, having a first output terminal and configured to output the first direct current; and
        a first coupling portion, having a first coupling terminal, the first coupling terminal and the first output terminal being connected to each other;
    a second conversion module, adapted to convert a second alternating current into a second direct current and comprising:
        a second body;
        a second input portion, having a second alternating current input terminal and configured to input the second alternating current;
        a second coupling portion, having a second coupling terminal;
        a third coupling portion, having a third coupling terminal, the third coupling terminal and the second alternating current input terminal being electrically connected to each other; and
        a second output portion, having a second output terminal and configured to output the second direct current, wherein the second output terminal and the second coupling terminal are connected to each other,
    wherein the first conversion module and the second conversion module are adapted to be separated from each other or combined together, when the first conversion module and the second conversion module are separated from each other, the first conversion module and the second conversion module are able to individually perform power conversion, and when the first conversion module and the second conversion module are combined together, the first conversion module and the second conversion module constitute a third conversion module adapted to convert a third alternating current into a third direct current.

2. The power supply device as recited in claim 1, wherein when the first conversion module and the second conversion module are combined together, the first coupling portion and the second coupling portion are coupled to each other.

3. The power supply device as recited in claim 2, wherein the second conversion module further comprises a direct current processing unit coupled between the second coupling portion and the second output portion.

4. The power supply device as recited in claim 3, wherein the third alternating current is input to the second conversion module from the second alternating current input terminal and undergoes power conversion through the direct current processing unit, and the second output terminal of the second output portion outputs the third direct current.

5. The power supply device as recited in claim 4, wherein the direct current processing unit is a parallel output circuit.

6. The power supply device as recited in claim 4, wherein the direct current processing unit is a series output circuit.

7. The power supply device as recited in claim 6, the second output terminal further comprising a positive terminal and a negative terminal, the direct current processing unit further comprising a touch switch electrically coupled between the positive terminal and the negative terminal, wherein when the first conversion module and the second conversion module are combined together, the touch switch is switched off, and when the first conversion module and the second conversion module are not combined together, the touch switch is switched on.

8. The power supply device as recited in claim 1, when the first conversion module and the second conversion module are combined together, the first alternating current input terminal and the third coupling terminal are engaged to combine the first body and the second body.

9. The power supply device as recited in claim 8, wherein the second body has a notch, and when the first body and the second body are combined together, the first body is securely mounted to the notch of the second body to form an intact appearance.

10. The power supply device as recited in claim 9, wherein when the first body and the second body are combined, the first coupling portion, the second coupling portion, the first input portion, and the third coupling portion are all hidden between the first body and the second body.

11. The power supply device as recited in claim 9, wherein the first body has a latching structure, the second body has an engaging structure disposed corresponding to the latching structure, and the latching structure and the engaging structure are adapted to be latched to each other, so as to position the first body and the second body.

12. The power supply device as recited in claim 11, wherein the engaging structure has a touch switch, when the latching structure and the engaging structure are latched to each other, the touch switch is switched off, and when the latching structure and the engaging structure are not latched to each other, the touch switch is switched on.

13. The power supply device as recited in claim 1, further comprising a base bracket separably disposed at a bottom of the second body and configured to increase a support area.

* * * * *